Aug. 28, 1934.　　　T. A. MITCHELL　　　1,971,573
METHOD OF CHLORIDIZING ORE METAL SULPHIDES
Filed May 18, 1932
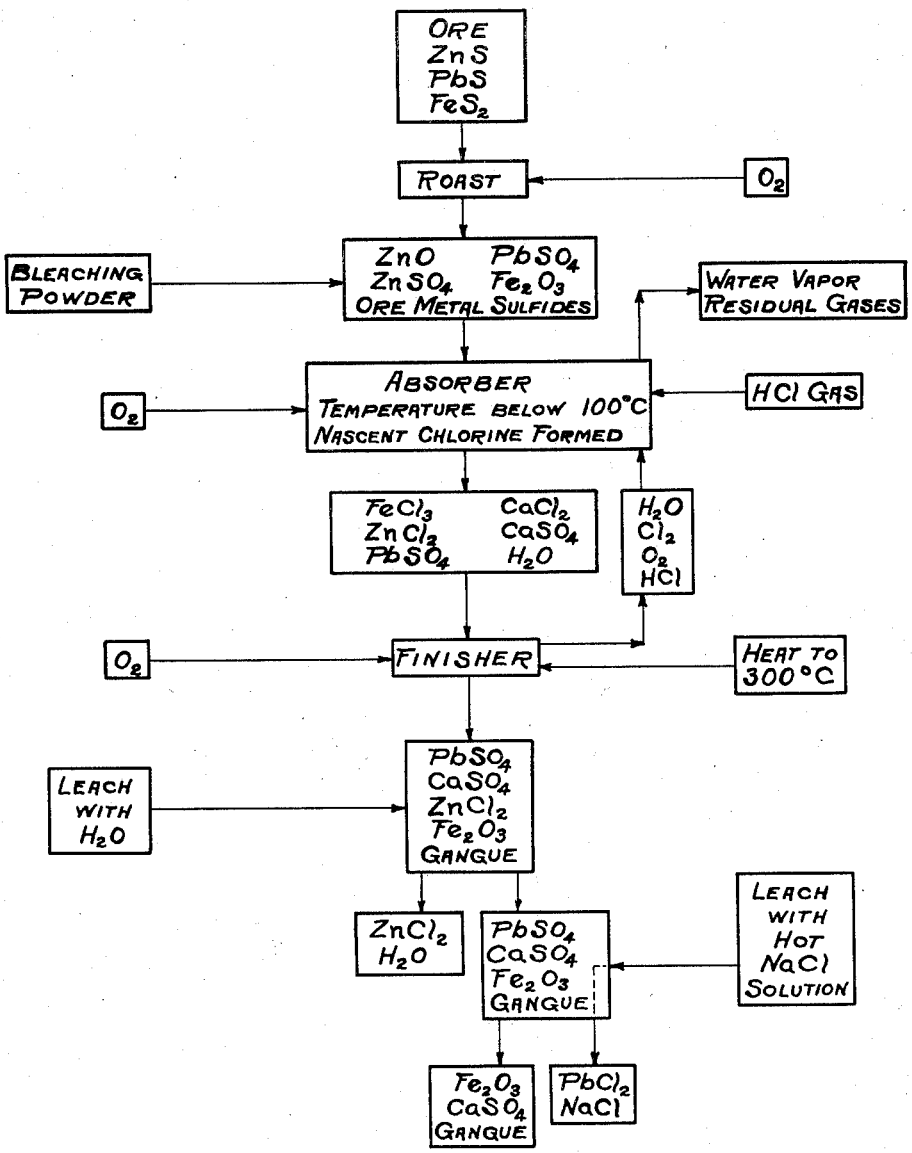
Inventor
THOMAS A. MITCHELL
By Clayton L. Jenks
Attorney Patented Aug. 28, 1934

1,971,573

UNITED STATES PATENT OFFICE

1,971,573

METHOD OF CHLORIDIZING ORE METAL SULPHIDES

Thomas A. Mitchell, Denver, Colo., assignor, by mesne assignments, to Hughes-Mitchell Processes, Incorporated, Denver, Colo., a corporation of Wyoming Application May 18, 1932, Serial No. 611,986

25 Claims. (Cl. 75—67)

This invention relates to the chloridization of ores, and more particularly to the recovery and separation of ore metal values from various sulphide ores, whether simple or complex, and whether concentrates or of low grade, which appear as a mass of ore metal sulphide crystals intertwined and intermixed with the ore gangue. The method is particularly applicable to ores which contain but little or no iron sulphide or other compound capable of aiding in the chloridizing operation.

In accordance with various hydro-metallurgical procedures, it has been proposed heretofore to roast a sulphide ore and then chloridize the roasted material with chlorine gas. It has been found, however, that there is a large waste of chlorine in such processes unless certain precautions are observed and that various metals, such as zinc and copper, tend to form sulphates as well as chlorides during the process, thus rendering the chloridizing action incomplete. If, for example, an ore containing zinc and lead sulphides is roasted by a low temperature autogenous roasting operation, there is a resultant production of both the sulphate and the oxide of zinc, as well as lead sulphate, with a large residue of unroasted sulphides; and any attempt at later chloridizing this material does not serve to remove the sulphate radical from the zinc, and thus results in an imperfect chloridization of this ore metal. Although the zinc oxide may be easily converted to a chloride by such inexpensive reagents as hydrochloric acid, yet the presence of a considerable amount of residual ore metal sulphides requires the use of chlorine for attack thereon; but this in turn results in the production of sulphur chloride and sulphur trioxide, or the sulphate radical. The latter replaces the combined chlorine in zinc chloride, for example, and forms a sulphate with the resultant loss of chlorine.

If, on the other hand, the ore is so roasted as to burn off all of the sulphide sulphur, other problems must be faced. The major expense in the roasting operation lies in removing the last 4 or 5% of the sulphide sulphur, and the high temperatures ordinarily required for this purpose make autogenous roasting impossible and cause the ore materials to sinter or fuse together and render the ore material impermeable to leaching solutions and reagent gases. Also, various undesired reactions take place, with the resultant formation of ore metal silicates, ferrates and various other complex compounds, which are chloridized only with great difficulty.

It is accordingly the primary object of this invention to provide a method of chloridizing ore materials, and particularly complex sulphide ores containing compounds of such metals as lead, zinc, gold, silver, copper, tin, iron, manganese, cadmium, cobalt, nickel, antimony, zirconium, cæsium, lithium and glucinum, and to provide an efficient and effective procedure for separating desired ore metals and recovering the same.

A further object of the invention is to provide a method of chloridizing a sulphide ore which results in a high recovery of a desired ore metal, such as zinc or copper, solely as a chloride uncontaminated by a sulphate thereof, and which serves effectively to chloridize the difficultly treated portions of the ore, such as the residual sulphides, silicates and the like.

This invention has for a further object, in particular, to provide an economical process for treating a simple or a complex sulphide ore, whereby the ore may be roasted under low temperature conditions and leaving a high content of ore metal sulphide and residual sulphide sulphur, and thereafter to chloridize the ore by a process in which the sulphide sulphur and sulphate radical in the ore play a direct and related part in the chloridizing operation.

With these and other objects in view, as will be apparent to one skilled in the art, this invention resides in the combination of process steps set forth in the specification and covered by the claims appended hereto.

In accordance with my invention, I propose to treat an ore material containing a considerable quantity of combined sulphur, and ore metal sulphides and sulphates in particular, in such a manner as to recover values of the ore as chlorides and to separate the same from other ore materials. I have found that the hypochlorites of the alkaline earth metals, calcium, strontium and barium, and particularly the commercial product known as "bleaching powder", are particularly effective to accomplish both the chloridization of the residual sulphides and other difficultly treated materials and the fixation of any available sulphate radical as an insoluble material, thus preventing the formation of a sulphate of certain desired ore metals. This reagent is peculiar in that both the basic and the acidic portions thereof play important roles in the process. The chlorine may be used to convert the ore metal sulphides to chlorides, while the alkaline earth metal stands ready to combine with any available sulphate radical, such as is presented by the $SO_3$ formed by oxidation of the ore sulphide sulphur, and fix it as an insoluble calcium sulphate which must go with the gangue and other insoluble residue.

Referring to the drawing, I have there illustrated diagrammatically a flow sheet, showing a process as required for treating a zinc, lead and iron sulphide ore and for recovering the zinc and lead therefrom, it being understood that various modifications may be made in the process without departing from the scope of my invention. Also, the process is applicable to sulphide ores containing compounds of any of the metals above listed, but it will be described herein with reference to a zinc, iron and lead ore, since the other metals will act substantially the same as one of these elements, which are specified herein as examples of metals which act differently in the process, whereby they may be readily separated. Any chemist skilled in the art will appreciate, in view of the following disclosure, what procedure should be adopted for recovering such other values.

In order that the invention may be fully understood, the procedure will be described with reference to an ore having the following composition:

| | Percent by weight |
|---|---|
| Zinc | 25 |
| Lead | 15 |
| Iron | 20 |
| Sulphur | 35 |
| Gangue | 5 |
| | 100 |

In accordance with my procedure, I propose first to roast this sulphide ore autogenously under comparatively low temperature conditions, so as to remove the major portion of the sulphide sulphur but to leave 4 or 5% or more in the roasted material. The second major stage of this process involves chloridizing the oxides of the partially roasted material by means of suitable reagents, such as hydrochloric acid gas, and chloridizing the residual ore metal sulphides, silicates and so forth by nascent chlorine generated by means of an alkaline earth metal hypochlorite or oxychloride, and preferably bleaching powder. These hypochlorites have the capacity of reacting at ordinary temperatures with hydrochloric acid and generating chlorine. Bleaching powder is made by passing chlorine over slaked lime, and its formula may be considered as $CaOCl_2.nCa(OH)_2$ or $CaCl_2.Ca(OCl)_2$ as representing an incomplete saturation of the lime. Considering the formula as $CaOCl_2$, its reaction with HCl may be written as:

$$CaOCl_2 + 2HCl = CaCl_2 + H_2O + Cl_2$$

The various hypochlorites of the alkaline earth metals, such as $Ba(OCl)_2$, will react similarly to produce nascent chlorine.

Because of the fact that the ore need not be roasted to a complete oxide condition or to remove all of the sulphide sulphur, the temperature of roasting may be very low, depending upon the nature of the ore being treated; and in the present case, the temperature is that at which the ore will burn autogenously or under its own heat of reaction. If desired, the roasting process may be aided by a gas, oil or other flame and by the addition of suitable combustible materials, such as another ore metal sulphide having a high sulphur content. Owing to the fact that the temperature may be kept comparatively low, there is little danger of the ore sintering or fusing, and particularly where there is a high content of various silicates commonly associated with ore metals as gangue.

The raw or concentrated ore being treated is ground to a small size, and preferably to a finely divided condition, so that the chemical reactions may take place substantially to the hearts of the ore particles. The roasting operation is preferably carried on in a furnace which permits the ore to be agitated thoroughly and continuously so as to further aid in preventing sintering or fusion of the ore particles. A roaster of the Wedge type having rakes on revolving arms or a rotary tube having baffles fastened to its inner walls, which serve to agitate the powdered material, will serve admirably for the purpose. The furnace conditions are so controlled that the lead goes largely to the sulphate form, while the zinc forms both the oxide and sulphate.

The roasting operation is preferably so controlled that the sulphate radical combined with the zinc and the residual sulphide sulphur are correctly proportioned to use up both the base and the acid of the calcium oxychloride. This condition is satisfied if the material coming from the roaster contains 5% of sulphide sulphur and 7½% of the sulphate radical as zinc sulphate. That is, the calcium element should be present in amount sufficient to fix all of the available sulphate radical, while there should be sufficient chlorine developed in the nascent condition and available in the reagent chlorides for the chloridizing operation. On the basis that the bleaching powder contains 34% available chlorine and 40% CaO content, the mixture may be made up of the following proportions, in which the roasted ore contains 5% of sulphide sulphur and 7½% zinc sulphate:

| Roasted ore | Bleaching powder |
|---|---|
| 100 lbs. | 35 lbs. |

Adjustments may be made for a larger or lower sulphate content in the ore. For instance, if the per cent of $SO_3$ is greater than 7½%, as above specified, free calcium oxide or chloride may be added to take care of this excess of sulphate radical and thus fix it as an insoluble calcium sulphate. The amount of the calcium compound added will, of course, be calculated in accordance with the molecular ratio of CaO to the available $SO_3$ in the roasted ore material. If there is less than 7½% of $SO_3$ present, then the excess lime content of the bleaching powder will be converted to calcium chloride and go with the soluble zinc chloride when the latter is leached from the ore material, unless there is added a proper addition of a suitable sulphate, such as zinc sulphate, in order to convert the calcium chloride to the insoluble calcium sulphate. It may be desirable to employ an excess of bleaching powder to insure the formation of an adequate amount of chlorine for the operation.

Of the various procedures which may be adopted for chloridizing such an ore, I preferably use an inexpensive reagent for converting the easily attacked zinc and other metal oxides to the chloride form and reserve the bleaching powder or the alkaline earth metal hypochlorite for the task of converting to the chloride form the residual ore metal sulphides and other difficultly chloridized materials, such as zinc silicate, zinc ferrate or ferrite and the like. A suitable reagent for the first chloridizing operation is hydrochloric acid gas and, as above explained, nascent chlorine and the intermediate reagent calcium chloride are used in the second operation.

The alkaline earth metal oxychloride may be employed in various ways for developing nascent chlorine, but my preferred practice involves intimately mixing the roasted ore with bleaching powder and then treating the mixture in a suitable apparatus, herein termed an absorber, with hydrochloric acid for generating chlorine and oxygen for oxidizing the sulphur compounds to produce the sulphate radical. The reaction of hydrochloric acid gas on a substantially dry mixture of bleaching powder and roasted ore causes the formation of nascent chlorine. The hydrochloric acid gas reacts at the same time with zinc, iron or other metal oxides to form the chlorides of the metals and water. Since the temperature is preferably kept below the boiling point of water, then the dry ore material becomes moist, although the process is carried on under substantially dry conditions. This chemical water aids in the reactions and serves to bring the nascent chlorine and reagent salts, such as ferric chloride and calcium chloride, into intimate contact with the ore material, whereby it may react easily therewith.

If the zinc content of the ore is very high, then it is preferable to remove some of this water in order to prevent the deliquescent zinc chloride from forming a viscous syrupy mass which hinders the penetration of the ore materials by the gases. This moisture control may be accomplished by passing the gases through the apparatus at such a rate and under such temperature conditions as to remove a considerable proportion of the water. The temperature is preferably below the boiling point of water and may be in the neighborhood of 80° C.

When the ore has a high content of zinc as oxide and/or sulphate, the ore may be first leached with dilute sulphuric acid or other solvent under conditions which leave sufficient sulphate in the residual ore to satisfy the requirements of the excess CaO content of the bleaching powder. Also, it is within the scope of my invention to roast a high zinc ore under sulphating conditions, in accordance with standard procedure, and to leach a portion of the zinc sulphate therefrom by water or other suitable solvent, but leave enough sulphate for the bleaching powder. This partial extraction of zinc has economic value, since filtering and washing are not required at this stage.

A further chloridizing stage may be employed, and particularly if the chloridized material contains the chloride, such as FeCl₃, of a metal which it is desired to retain in the residue. By heating ferric chloride with oxygen, it may be converted to ferric oxide. This stage is known as the finishing stage, in which the partially chloridized ore is heated in the presence of oxygen to a temperature at which ferric chloride is not stable and under conditions which cause its ultimate appearance in the ore residue as ferric oxide. A temperature which is found suitable for this purpose is from 250° C. to 300° C.; and under this temperature condition and in the presence of oxygen or air admitted for the purpose, the ferric chloride is decomposed to form ferrous oxide, which is then oxidized to the ferric oxide condition. The result of this step is the formation of nascent chlorine, and if any considerable amount of water vapor is present, hydrochloric acid gas may likewise be produced.

Referring now to the flow sheet on the drawing, which illustrates my preferred process for treating an ore containing iron, zinc and lead sulphides and other materials, I may employ an autogenous roasting operation which produces both the sulphate and the oxide of zinc, ferric oxide and lead sulphate. This step may then be followed by disintegrating the roasted material, if necessary, and then mixing it with the correct proportion of bleaching powder. This intimately mixed, pulverulent dry material may then be treated by the cold absorber operation, in which hydrochloric acid gas and oxygen or air are passed through the absorber and there caused to contact with the ore material and the bleaching powder.

The absorber, as well as the finisher, may be an apparatus having a series of horizontal shelves arranged one above another and a set of revolving rakes arranged to stir the material on each shelf and to sweep it through an opening to a shelf below. The apparatus may be water jacketed or heated by gases for the purpose of cooling or heating the reaction chambers, or a double walled compartment surrounding the muffle reaction chambers and containing a heat transfer gas or liquid may be used. If desired, the finisher may be heated by a flame introduced directly into the reaction chamber or into an outer compartment surrounding an inner muffle space. Various types of apparatus may be used for the purpose, such as that shown in my copending application Serial No. 593,932 filed February 18, 1932.

In the absorber, hydrochloric acid gas, in quantity sufficient to form a strong atmosphere, and air are admitted preferably near the exit end and passed in counterflow relation to the traveling ore mixture. Likewise, air is admitted near the exit end of the finisher and the gaseous products are passed through the apparatus and preferably into the absorber where they are further employed. The exit end of the finisher is heated to about 300° C., while the entrance end may have the temperature of the ore coming from the comparatively cold absorber. If desired, both stages of the process may be carried on in the same apparatus, as illustrated in my co-pending case.

In the absorber, the hydrochloric acid gas causes various reactions. As above stated, it combines with zinc oxide and iron oxide to form zinc and iron chlorides, and if the iron oxide is in the ferric condition, then ferric chloride will be formed. The bleaching powder is also attacked at a low temperature by the hydrochloric acid gas, thus forming nascent chlorine which, in the presence of the moisture surrounding the ore particles, is brought into very intimate contact therewith and causes the ore metal sulphides, silicates, ferrates, ferrites and so forth to be converted to the chlorides. The attack of chlorine gas on zinc sulphide, for example, is presumed to form zinc oxide and sulphur. Any zinc oxide thus formed, as well as any zinc sulphate present, is converted to zinc chloride by reaction with the calcium chloride or hydrochloric acid present. The sulphur is likewise chloridized to form sulphur chloride which is oxidized by the oxygen present to sulphur dioxide and sulphur trioxide.

The sulphur trioxide is a source of available sulphate radical, and were it not for the basic portion of the calcium oxychloride, this SO₃ would unite with zinc oxide or zinc chloride to form zinc sulphate and thus contaminate the final product with the ore metal sulphates. The alkaline earth metal has the capacity of combining with all available sulphate radical which has not already been fixed as an insoluble product, such as the lead sulphate previously formed in the roasting operation, and thereby fixes this sulphate radical as the insoluble calcium sulphate which goes with the residue in a subsequent leaching operation. The calcium element of the molecule, therefore, stands ready at all times; and because of its intimate contact with the ore material, it serves as a means to keep the zinc oxide or zinc chloride from being sulphated and forces them to go to the chloride condition. The calcium chloride formed from the bleaching powder reacts in the presence of water with zinc sulphate, for example, to form calcium sulphate and zinc chloride. An excess of bleaching powder in the absorber will yield $CaCl_2$ in excess for use in the finisher to fix any sulphur trioxide there formed.

If no iron is present in the roasted ore mixture, the chloridizing process may be stopped at the end of the absorber stage, unless it is found that certain ore materials require a higher temperature for their chloridization or their recovery. In the latter event, and particularly if ferric chloride has been formed in the absorber, the material is now passed through the finisher in which the temperature is raised to about 300° C. and sufficient oxygen is admitted to insure that the ferric chloride is decomposed, with the resultant formation of nascent chlorine and the conversion of the ferrous oxide thus produced to the ferric condition. At the colder end of the finisher zone, there is water present which tends to dissolve the ferric chloride and bring it into intimate contact with the ore where the nascent chlorine is able to attack the unchloridized ingredients present in the ore, or added for the purpose. The decomposition of the ferric chloride may take place in stages, resulting first in the formation of ferrous chloride which is then broken down to ferrous oxide. Since water is present, there may also be hydrochloric acid formed by the decomposition of the iron chloride. Whatever reactions may take place, the net result is the formation of a chloridizing agent in intimate contact with the ore which is able to attack the chloridizable materials still remaining in the ore.

I provide sufficient bleaching powder or calcium oxide or chloride for use in the finisher so that all of the available sulphate radical formed or present in the material being treated will be converted to the insoluble alkaline earth metal sulphate. By correctly proportioning the ingredients, I may avoid having any large quantity of calcium chloride left in the finisher product but, if present, it will go with the soluble salts during a subsequent leaching operation. As the result of this treatment, the lead is present largely as a sulphate, the iron as ferric oxide and the zinc as the soluble chloride. Consequently, it is now simple to separate these materials by a leaching operation. To this end, I may leach the finisher product with water or with an ammoniated solution of ammonium carbonate or other desired solvent. This takes the zinc and calcium chlorides from the ore material, leaving lead and calcium sulphates and ferric oxide with the gangue.

For the purpose of separating the calcium chloride found in the zinc chloride solution, I may employ various procedures, such as that of adding calcium carbonate to the solution, thus precipitating zinc carbonate and leaving only calcium chloride in solution. The lead which is present with the gangue may be likewise recovered by suitable methods. For example, a hot solution of sodium chloride may be employed to leach the ore residue and convert the lead sulphate to lead chloride and dissolve it from the gangue. Then, by cooling the solution, the lead chloride crystals will separate out. Manganese may be recovered as a chloride with the zinc chloride solution and precipitated as the dioxide by means of zinc oxide added to the solution. Any silver will go with the lead chloride as a chloride and may be separated from it by being dissolved in ammonium hydroxide which does not dissolve the lead chloride. Various other procedures may be adopted for separating and recovering the valuable ore materials which may be present in the ore.

In view of the above explanation, it will now be appreciated that while the various other ore metals which may be treated by this process will each react in accordance with its own peculiar characteristics, yet the process is generally applicable to all of the metals mentioned above. For example, if manganese is present in the ore as manganese dioxide, the treatment with hydrochloric acid will produce manganous chloride and chlorine gas; whereas copper sulphide will be oxidized to cupric oxide which is converted to cupric chloride by the action of hydrochloric acid gas. Nickel will act substantially the same as manganese in generating chlorine, and will be chloridized. Such side reactions as may take place do not interfere with the general process, which is that of converting various metal compounds found in the sulphide ore to chlorides, whereby they may be readily separated from other ore ingredients. Lead is roasted directly to the sulphate form, but it is found that some lead chloride is present at the end of the process. Lead sulphate and lead chloride are substantially insoluble in cold water, hence one may separate lead from the soluble ore metal chlorides by a simple leaching operation.

It will also be appreciated that different temperatures will be required in the finisher, depending upon the nature of the ore metal compound there present. On the basis of a finisher temperature of 350° C., cobalt and nickel chlorides would be sublimed and condensed. Zirconium chloride would act likewise, if the finisher temperature were about 400° C. The physical and chemical characteristics of the ore metal chlorides are to be found in the literature and such knowledge may be suitably employed in the process, as will be readily understood by any chemist skilled in this art. Hence, the temperature control of the finisher and the exact conditions of operation in the absorber will necessarily be changed in accordance with such standard knowledge as is now available. The exact procedure adopted will, of course, depend upon whether one wishes to have the desired product appear in the residue or as a soluble salt or to sublime it and capture it in a condenser. On the basis of a finisher temperature of 350° C., the chlorides of various metals can be obtained by the process and be leached by means of water from the finisher product, such as manganese, antimony, zinc, calcium, copper, cadmium, cæsium, glucinum, lithium and zirconium. Hence, if any of the chlorides of these particular metals are intermixed with iron chloride, the finisher treatment above described furnishes an easy method of separating them, the iron going with the residue and the other as a soluble salt. By employing lower temperatures, one may obtain the chlorides of iron, cobalt, nickel, antimony and other metals without breaking them down. The claims are, therefore, to be interpreted as applying to sulphide ores containing compounds of any of these metals or mixtures thereof which are capable of being recovered by the above described procedure.

It will also be appreciated, in view of the above disclosure, that my invention contemplates chloridizing compounds of any of the above named metals, such as the sulphides or other sulphur compounds, which are capable of providing available sulphate radical during the process, or which are treated in the presence of other sulphur compounds and under reaction conditions which develop the sulphate radical, provided the reaction is carried on in the presence of an alkaline earth metal compound, such as the oxide, carbonate, chloride or other chlorine compound of calcium, strontium or barium, which is capable of and is proportioned for reacting with all of the available sulphate radical and fixing it as an insoluble alkaline earth metal sulphate. In this way, it is possible to get the desired metal chloride uncontaminated by its sulphate.

Various features of this process and particularly the absorber and finisher steps are covered by my copending application Serial No. 687,827 filed September 1, 1933.

Having thus described my invention, what I claim as new and desire to secure by Letters Patent is:

1. The method of chloridizing an ore material which provides available sulphate radical during the process comprising the steps of mixing the ore material with an alkaline earth metal chlorine compound capable of and proportioned for providing chlorine and fixing any available sulphate radical as an insoluble alkaline earth metal sulphate, treating the mixture at a low temperature and in a substantially dry condition with a reagent capable of reacting with said compound to develop nascent chlorine and cause an ore value to be chloridized and remain intermixed with the ore material, while the alkaline earth metal fixes the available sulphate radical developed during the process, and thereafter leaching the ore material with a solvent for the ore metal chloride and thereby forming an ore metal chloride solution free from its sulphate as well as the ore residue and alkaline earth metal sulphate.

2. The method of claim 1 in which an ore material containing a chloridizable ore metal sulphide is chloridized in mixture with alkaline earth metal oxychloride by means of hydrochloric acid gas and air.

3. The method of treating a chloridizable ore material capable of providing sulphide sulphur and the sulphate radical during the process comprising the steps of intimately mixing the ore material with an alkaline earth metal chlorine compound capable of and proportioned for providing nascent chlorine for the chloridizing operation and sufficient alkaline earth metal to fix all of the available sulphate radical as an insoluble alkaline earth metal sulphate, treating the mixture in a substantially dry condition with hydrochloric acid under oxidizing conditions suitable for forming nascent chlorine and the sulphate radical and thereby forming an ore metal chloride, and thereafter leaching the soluble ore metal chloride from the ore residue.

4. The method of treating an ore metal sulphide comprising the steps of partially roasting the same to provide a mixture of ore metal oxide and sulphide, making an intimate mixture of the roasted ore material with an alkaline earth metal compound capable of developing nascent chlorine during the process and treating the mixture with an acid and under oxidizing conditions to develop nascent chlorine and to fix the available sulphate radical as an insoluble alkaline earth metal sulphate.

5. The method of treating a sulphide ore containing a compound of a metal capable of forming either the chloride or the sulphate during the process, comprising the steps of partially roasting the ore under low temperature and oxidizing conditions to form a roasted material containing both the sulphide and the sulphate of said ore metal, mixing the roasted material in finely divided condition with alkaline earth metal oxychloride proportioned to react with all of the available sulphate radical, and then treating the mixture with hydrochloric acid under oxidizing conditions to develop nascent chlorine and convert the ore metal sulphide to a chloride and fix as an insoluble alkaline earth metal sulphate all of the available sulphate radical.

6. The method of treating a sulphide ore capable of providing available sulphate radical during the process, comprising the steps of partially roasting the ore autogenously under low temperature and oxidizing conditions and leaving residual sulphide sulphur therein, mixing the material intimately and in finely divided dry condition with alkaline earth metal oxychloride proportioned to provide nascent chlorine and react with all of the available sulphate radical, and then treating the mixture with hydrochloric acid gas and oxygen to cause the formation of nascent chlorine and the oxidation of the sulphide sulphur to produce sulphate radical which is fixed as an alkaline earth metal sulphate.

7. The method of roasting a complex sulphide ore capable of providing available sulphate radical during the process, comprising the steps of partially roasting the ore to a condition whereby the roasted material contains approximately 5% of sulphide sulphur and 7½% of available sulphate radical, then mixing the roasted material with bleaching powder proportioned to combine with all of said sulphate radical, and then treating the mixture in a substantially dry condition but in the presence of water with hydrochloric acid gas to cause the formation of nascent chlorine and the fixation of the available sulphate radical as alkaline earth metal sulphate.

8. The method of treating a complex sulphide ore capable of providing available sulphate radical during the process, comprising the steps of partially roasting the ore under low temperature and oxidizing conditions, providing an intimate, finely divided dry mixture of the roasted material with an alkaline earth material containing calcium proportioned to react with all available sulphate radical and sufficient chlorine to chloridize the sulphide sulphur, and then treating the mixture at a low temperature with hydrochloric acid gas and in the presence of oxygen to develop nascent chlorine from said alkaline earth material and to fix the available sulphate radical as calcium sulphate.

9. The method of chloridizing a partially roasted sulphide ore comprising the steps of mixing the ore material with alkaline earth metal oxychloride and so proportioning said ingredients and so adjusting the composition of the ore material that substantially all of the alkaline earth metal and the chlorine in the reagent are utilized to convert the residual ore metal sulphide to a chloride and to fix all available sulphate radical as an insoluble alkaline earth metal sulphate, and then passing hydrochloric acid gas and air into contact with the material, while maintaining the temperature below 100° C. and regulating the moisture content to keep the ore material moist but substantially dry and carry on said reactions.

10. The method of treating a complex sulphide ore capable of providing available sulphate radical during the process, comprising the steps of partially roasting the ore under low temperature and oxidizing conditions, providing an intimate, finely divided, dry mixture of said roasted ore with bleaching powder proportioned to provide alkaline earth metal in quantity sufficient to fix all of the available sulphate radical as an insoluble sulphate, and treating the mixture in a moist but substantially dry condition with hydrochloric acid gas and oxygen to form nascent chlorine and said sulphate, while regulating the moisture content during the chloridizing treatment.

11. The method of treating a sulphide ore capable of providing available sulphate radical during the process, comprising the steps of roasting the ore autogenously, mixing the roasted material with bleaching powder proportioned to react with all of the available sulphate radical, treating the mixture in a finely divided, substantially dry condition with hydrochloric acid gas and air, while regulating the moisture content of the ore material and maintaining the temperature below 100° C., thereby causing the hydrochloric acid gas to react with the available metal oxide and the nascent chlorine derived from the bleaching powder to react with the difficultly chloridized ore materials and the calcium to fix all available sulphate radical as an insoluble sulphate.

12. The method of treating a complex sulphide ore capable of providing available sulphate radical during the process, comprising the steps of partially roasting the ore, mixing the roasted material intimately and in finely divided dry condition with alkaline earth metal oxychloride, treating the mixture with hydrochloric acid gas and oxygen to cause the formation of nascent chlorine and the conversion of the residual sulphide sulphur and any available sulphate radical to alkaline earth metal sulphate, and thereafter raising the temperature of the chloridized material to a point at which a metal chloride therein is unstable and maintaining conditions which cause the formation of a further chloridizing agent therefrom.

13. The method of the preceding claim, in which the ore contains iron sulphide and it is roasted under oxidizing conditions to produce ferric oxide which is converted by the hydrochloric acid gas to ferric chloride and ultimately heating the chloridized material to a temperature in excess of 250° C. and in the presence of oxygen to convert the iron chloride to ferric oxide.

14. The method of treating a sulphide ore containing the sulphides of iron and another metal, which is capable of providing available sulphate radical, comprising the steps of partially roasting the ore autogenously, providing an intimate mixture of the roasted material with calcium oxychloride proportioned to form calcium sulphate with all of the available sulphate radical, treating the mixture with hydrochloric acid gas and air, while maintaining the temperature below 100° C., thereafter heating the chloridized material in the presence of oxygen to a temperature at which ferric chloride is unstable and forming insoluble ferric oxide, and thereafter separating the soluble ore metal values from the insoluble calcium sulphate and ferric oxide.

15. The method of treating a chloridizable ore material containing a compound of a metal of the group consisting of zinc, copper, gold, silver, iron, manganese, cobalt, nickel, antimony, cadmium, cæsium, glucinum, lithium and zirconium, comprising the step of chloridizing the same with hydrochloric acid and an alkaline earth metal compound capable of and proportioned for fixing all available sulphate radical as an insoluble sulphate and for developing nascent chlorine, and thereby forming an ore metal chloride and forming an insoluble alkaline earth metal sulphate.

16. The method of treating a sulphide ore containing a chloridizable compound of a metal of the group consisting of lead, tin, zinc, copper, gold, silver, iron, manganese, cobalt, nickel, antimony, cadmium, cæsium, glucinum, lithium and zirconium, comprising the steps of roasting the ore and thereafter chloridizing it under oxidizing conditions with hydrochloric acid gas and an alkaline earth metal compound capable of and proportioned for fixing all of the available sulphate radical as an insoluble metal sulphate and for developing nascent chlorine, and thereby forming a chloride of an ore metal.

17. The method of claim 16 in which an alkaline earth metal oxychloride is employed to furnish both nascent chlorine for the chloridizing operation and alkaline earth metal to fix as an insoluble sulphate all of the available sulphate radical derived from the sulphide ore.

18. The method of treating a sulphide ore containing a high zinc content comprising the steps of partially roasting the ore, removing a portion of the zinc content and leaving zinc sulphate in the residue in quantity sufficient for the chloridizing reaction and then chloridizing the ore material in a substantially dry but moist condition with hydrochloric acid and an alkaline earth metal compound capable of reacting with the zinc sulphate and fixing all of the available sulphate radical as an insoluble alkaline earth metal sulphate and of providing chlorine for chloridizing the residual ore metal sulphide.

19. The method of treating a zinc sulphide ore comprising the steps of roasting the ore under sulphating conditions, dissolving some of the zinc sulphate from the roasted material and thereafter chloridizing the residue with hydrochloric acid and alkaline earth metal oxychloride proportioned to provide chlorine for the reaction and to fix the available sulphate radical as insoluble alkaline earth metal sulphate.

20. The method of chloridizing an ore material which provides available sulphate radical during the process comprising the steps of providing an intimate mixture of the ore material with an alkaline earth metal oxychloride, treating the mixture with a reagent capable of developing nascent chlorine from said oxychloride and thereby chloridizing an ore metal value, and providing for the reaction sufficient sulphate radical to transpose to the sulphate any alkaline earth metal chloride formed during the process and thus provide further chlorine for the chloridizing operation.

21. The method of claim 20, in which a sulphide ore is partially roasted to such a condition that sufficient sulphur compound of an ore metal is provided to transpose the alkaline earth metal chloride to a sulphate.

22. The method of treating an ore material capable of providing available sulphate radical during the process comprising the steps of providing a reagent including an alkaline earth metal and the acid radical of hypochlorous acid and treating the ore material in intimate mixture with said reagent and an acid capable of developing nascent chlorine therefrom, and proportioning the ore material ingredients so that all alkaline earth metal chloride present is transposed to a sulphate, with the resultant chloridization of the ore material by both nascent chlorine and the intermediate chloride formed from the reagent.

23. The method of chloridizing an ore material containing an ore metal sulphur compound capable of developing the sulphate radical during the process comprising the steps of providing an intimate mixture of the material with iron chloride and an alkaline earth metal oxychloride proportioned to fix all of the available sulphate radical as an insoluble compound, treating the mixture in a substantially dry condition with a reagent capable of causing the release of the chlorine from said oxychloride and the chloridization of an ore metal value and thereafter heating the material with air to convert any iron chloride present to ferric oxide and causing any chloridizing gas thus formed to react with the ore material.

24. The method of the previous claim in which ferric oxide is present in the ore material and the latter is treated with hydrochloric acid gas to form ferric chloride therein.

25. The method of chloridizing an ore material containing ferric oxide and an ore metal sulphur compound capable of developing the sulphate radical during the process comprising the steps of mixing the ore material with an alkaline earth metal oxychloride proportioned to react with the available sulphate radical, treating the mixture in a substantially dry condition with hydrochloric acid gas to form ferric chloride and nascent chlorine, then heating the mixture with air to convert any iron chloride present to ferric oxide, and thereafter dissolving the soluble ore metal chlorides and thus separating them from the residue containing the iron oxide and alkaline earth metal sulphate.

THOMAS A. MITCHELL.